(12) United States Patent
Tsou et al.

(10) Patent No.: US 8,904,620 B2
(45) Date of Patent: Dec. 9, 2014

(54) METALLIC HOUSING FORMING METHOD

(71) Applicants: Meng-Yu Tsou, New Taipei (TW); Wei-Jian Dai, Shenzhen (CN)

(72) Inventors: Meng-Yu Tsou, New Taipei (TW); Wei-Jian Dai, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 13/632,276

(22) Filed: Oct. 1, 2012

(65) Prior Publication Data

US 2013/0263428 A1 Oct. 10, 2013

(30) Foreign Application Priority Data

Apr. 6, 2012 (CN) .......................... 2012 1 0098893

(51) Int. Cl.
*B23P 17/00* (2006.01)
*C25D 11/16* (2006.01)
*C25D 11/18* (2006.01)
*C25D 11/34* (2006.01)

(52) U.S. Cl.
CPC ................ *B23P 17/00* (2013.01); *C25D 11/16* (2013.01); *C25D 11/18* (2013.01); *C25D 11/34* (2013.01)

USPC .......................... 29/460; 29/525.14; 148/518

(58) Field of Classification Search
CPC ........ B23P 17/00; C25D 11/16; C25D 11/18; C25D 11/34; C25D 11/246; C25F 1/04; C25F 3/16; C25F 25/00
USPC ............... 29/90.7, 458, 460, 525.14; 148/518
See application file for complete search history.

(56) References Cited

U.S. PATENT DOCUMENTS

| | | | |
|---|---|---|---|
| 2,897,588 A * | 8/1959 | Chapman | 228/203 |
| 5,226,976 A * | 7/1993 | Carlson et al. | 148/257 |
| 5,837,117 A * | 11/1998 | Allegret | 205/50 |
| 6,820,335 B2 * | 11/2004 | Schwartz | 29/889.72 |
| 6,921,443 B1 * | 7/2005 | Starcevic | 148/518 |
| 2013/0008796 A1 * | 1/2013 | Silverman et al. | 205/50 |

* cited by examiner

*Primary Examiner* — Jermie Cozart
(74) *Attorney, Agent, or Firm* — Novak Druce Connolly Bove + Quigg LLP

(57) ABSTRACT

A metallic housing forming method includes steps as follows: friction stir welding metallic members to form a metallic housing; immersing the metallic housing in an alkali solution to remove contaminants from the metallic housing, and forming a black salt layer on the metallic housing; stripping the black salt layer away from the metallic housing; electropolishing the metallic housing to dissolve the outermost surface of the metallic housing; anode-oxiding the metallic housing; and sealing and drying the metallic housing.

20 Claims, 2 Drawing Sheets

METALLIC HOUSING FORMING METHOD

BACKGROUND

1. Technical Field

The present disclosure relates to metallic housing forming methods, and more particularly, to a metallic housing forming method having a friction stir welding process.

2. Description of Related Art

Aluminum, zinc, and magnesium alloys are used in metallic housings due to a lower density and a high conductivity coefficient. A couple of metallic members are typically combined together to form a metallic housing by welding process. The metallic housing is then treated by anode-oxiding procedure to avoid corruption. However, a corrosion line may be produced on the metallic housing during the anode-oxiding process, and chromatic aberration is produced between the welding portion and other portions of the metallic housing. Thus, it is very difficult to obtain an attractive appearance on the metallic housing.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure.

DETAILED DESCRIPTION

Figure 1A:
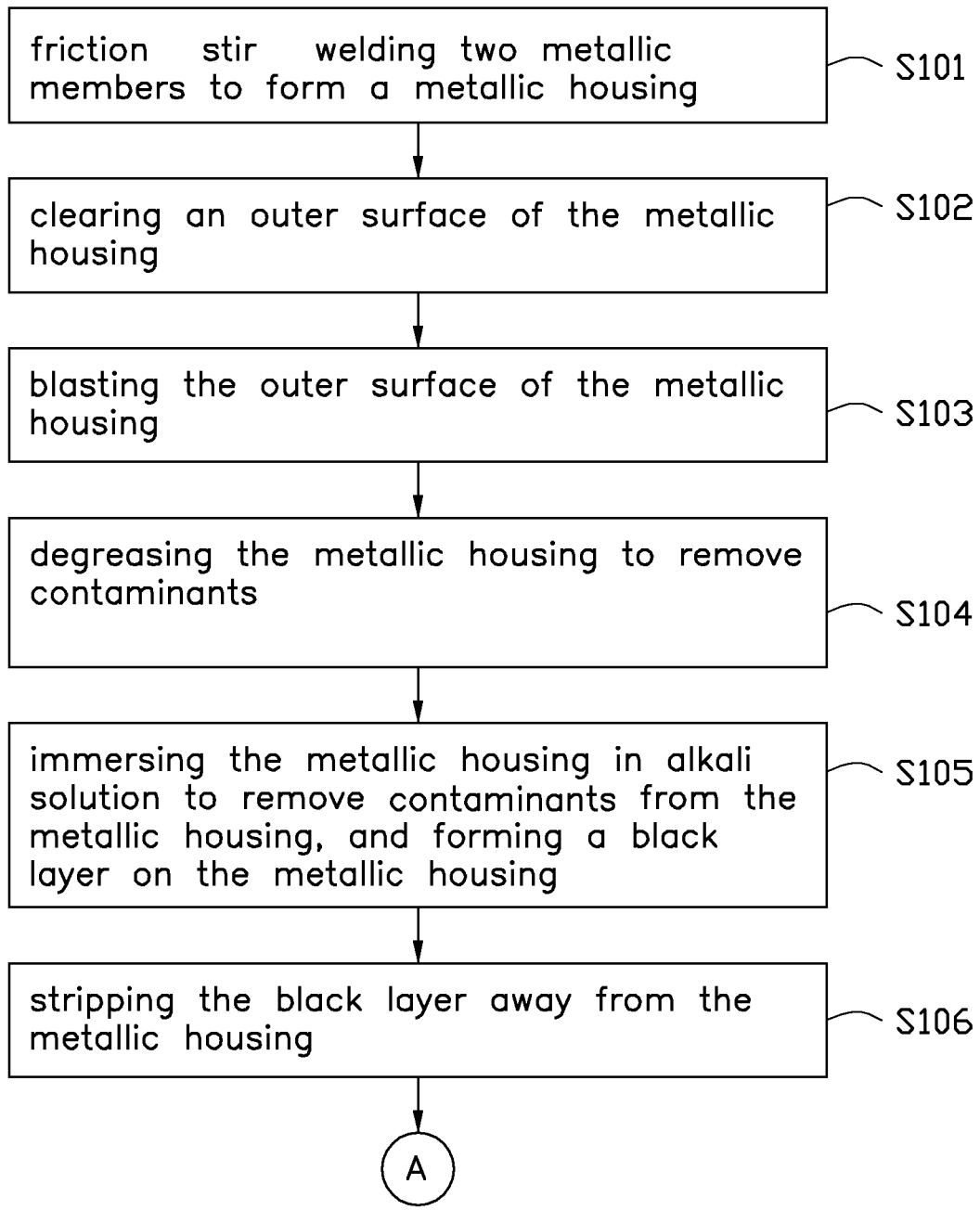
FIGS. 1A and 1B show a flow chart of an embodiment of a metallic housing forming method.
Figure 1B:
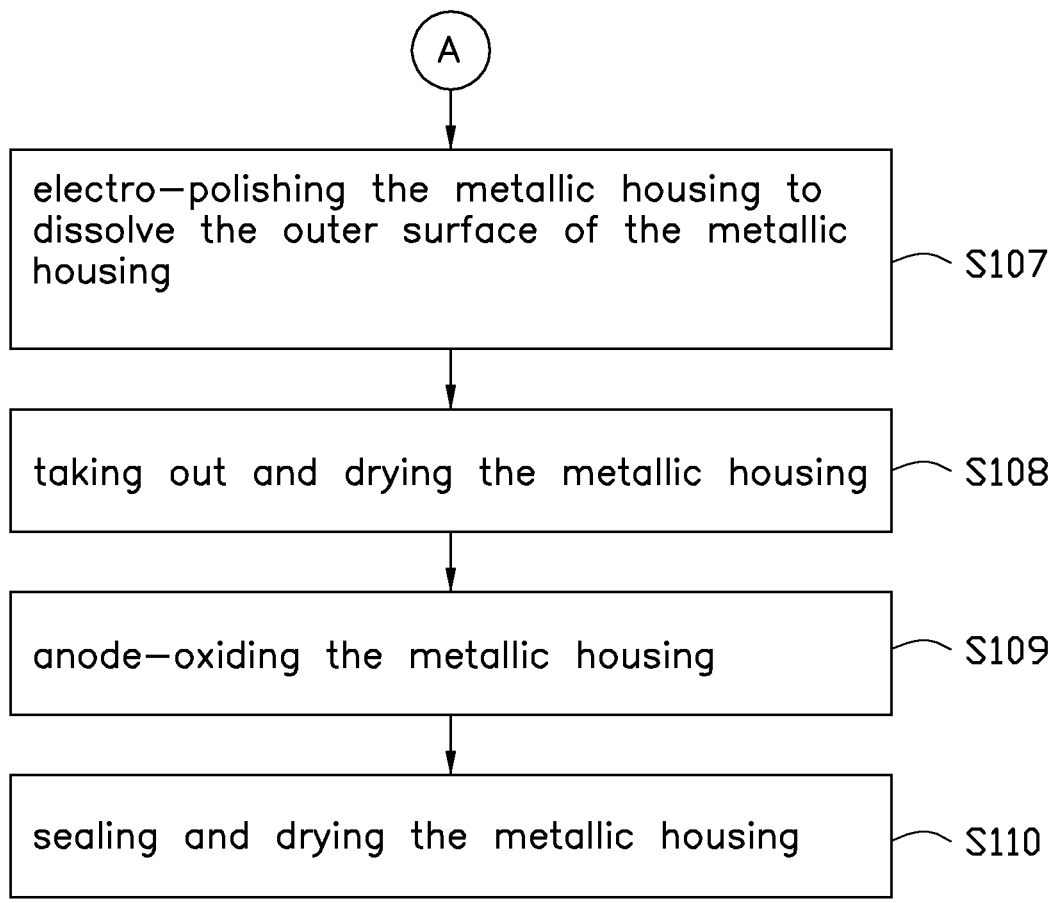

FIGS. 1A and 1B show a flow chart of an embodiment of a metallic housing forming method. The detail steps of the forming method are as follows:

Step S101, two metallic members are provided to be welded by a friction stir welding process to form a metallic housing. In the embodiment, the metallic housing is computer housing made of 5052 aluminum.

Step S102, a clearing process is applied to an outer surface of the metallic housing.

Step S103, a surface blasting process is applied to the outer surface of the metallic housing.

Step S104, a degreasing process is applied to the metallic housing to remove contaminants. In the embodiment, the metallic housing is immersed in an alkali solution, such as NaOH, $Na_2CO_3$, $Na_3PO_4$ liquid. Greases adhering on the metallic housing react with the alkali solution and generate many kinds of soluble salts, which may then be removed.

Step S105, the metallic housing is immersed in an alkali solution to remove contaminants from the metallic housing. In detail, the metallic housing is immersed in the alkali solution such as NaoH solution for a period of time. The outermost surface layer of the metallic housing reacts with the solubility alkali solution to improve a roughness and a brightness of the metallic housing. In the embodiment, a black layer consisted of $NaAlO_2$ is formed on the outer surface of the metallic housing during the immersing process by the reaction. The $NaAlO_2$ layer is a black soluble salt layer (black layer).

Step S106, the black layer is stripped away from the metallic housing.

Step S107, an electro-polishing process is applied to the metallic housing to dissolve the extreme outer surface of the metallic housing, for obtaining a better appearance. In the embodiment, a direct current (DC) electrical charge is employed to polish the metallic housing and restrain a redox-reaction between the metallic housing and the alkali solution. Firstly, the metallic housing is immersed in the electrolyte, the metallic housing is employed as an anode electrode, and an insoluble metal is employed as a cathode electrode. In the embodiment, the cathode electrode is made of stainless steel. The electrolyte consists of sulphuric acid, orthophosphoric acid and aluminum ion. A volume ratio of the sulphuric acid and orthophosphoric acid is about 2.5~4. Preferably, the volume ratio is about 3±0.3. The concentration of the aluminum ions is about 10~20 grams per liter. Preferably, the concentration of the aluminum ions is about 15 grams per liter. The temperature of the electrolyte is about 70~82 degrees Celsius. Preferably, the temperature is about 77±2 degrees Celsius. Secondly, the DC electrical charge is provided to the electrolyte and the metallic housing to take up an electro-polishing process. A value of the DC electrical charge in amperes is about 1.0~1.5 times the surface area of the outer surface of the metallic housing in square decimeters. In the embodiment, the surface area of the metallic housing is 70 square decimeters, the value of the DC electrical charge varies from 70 to 105 amperes. Preferably, the value of the DC electrical charge is about 100±20 amperes. The duration of the electro-polishing is about 12~38 seconds, and preferably the duration is about 20±2 seconds. In the process, the DC electrical charge is capable of restraining a redox-reaction between the metallic housing and the alkali solution. Moreover, impurities of the welding portion of the alkali solution are unable to generate a corrosion line by the redox-reaction. During the electro-polishing process, an outer surface of the metallic housing is dissolved to some extent and becomes smoother and more reflective. The glossiness coefficient of the metallic housing is about 33~45.

Step S108, the metallic housing is taken out and dried. The metallic housing is taken out from the electrolyte and held exposed to the atmosphere for a period of time. In the embodiment, the period is about 12 seconds. The period of the metallic housing being exposed to the atmosphere can be changed according to the outer surface of the metallic housing.

Step S109, an anode-oxiding process is applied to the metallic housing. In the embodiment, the voltage of the anode-oxiding process is about 12.5 volts, and the temperature is about 12~23 degrees Celsius. The time period of the anode-oxiding is about 21~23 minutes.

Step S110, the metallic housing is sealed and dried. In sealing, the metallic housing is immersed in boiling water or nickel acetate solution for about 10 minutes to seal microstructures on the surface of the metallic housing, for decreasing an adsorptive capacity of the surface of the metallic housing.

As the metallic housing is fabricated by a friction stir welding process, damage or trauma to the welded portion of the metallic housing is decreased. The surface of the metallic housing is dissolved to some extent and becomes smoother and glossier, thus a more attractive appearance is achieved. Any impurities of the welded portion are unable to generate a corrosion line by the redox-reaction, such that an appearance of the metallic housing is far less prejudiced.

The steps of S102, S103, S104 may be omitted, when an independent surface blasting process is not needed.

The magnitude of the DC electrical charge employed in the electro-polishing process may be changed according to the nature of the outermost surface of the metallic housing.

The metallic housing may be made from aluminum alloys, or other light metal materials capable of undergoing an anode-oxiding process, such as magnesium/ferrous/ferric/magnetism alloy.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A metallic housing forming method, comprising:
   friction stir welding metallic members to form a metallic housing;
   immersing the metallic housing in alkali solution to remove contaminants from the metallic housing, and forming a black layer on the metallic housing;
   stripping the black layer away from the metallic housing;
   electro-polishing the metallic housing to dissolve an extreme outer surface of the metallic housing;
   anode-oxiding the metallic housing; and
   sealing and drying the metallic housing.

2. The metallic housing forming method of claim 1, further comprising a step of taking out the metallic housing and drying the metallic housing between the step of electro-polishing the metallic housing and the step of anode-oxiding the metallic housing.

3. The metallic housing forming method of claim 1, further comprising a step of clearing an outer surface of the metallic housing between the step of immersing the metallic housing in alkali solution and the step of welding the metallic housing.

4. The metallic housing forming method of claim 3, further comprising a step of degreasing the metallic housing to remove contaminants from the metallic housing between the step of clearing an outer surface of the metallic housing and the step of welding the metallic housing.

5. The metallic housing forming method of claim 4, further comprising a step of blasting the outer surface of the metallic housing between the step of clearing the metallic housing and the step of degreasing the metallic housing.

6. The metallic housing forming method of claim 5, wherein the electrolyte is consisted of sulphuric acid, orthophosphoric acid and aluminum ion, a volume ratio of the sulphuric acid and orthophosphoric acid is about 2.5~4, a concentration of the aluminum ion is about 10~20 grams per liter.

7. The metallic housing forming method of claim 5, wherein the temperature of the electrolyte is about 70~82 degrees Celsius, a value of the direct-current electrical charge in ampere is 1.0~1.5 times of a surface area value of the outer surface of the metallic housing in square decimeter.

8. The metallic housing forming method of claim 7, wherein the temperature of the electrolyte is about 77±2 degrees Celsius, a duration period of the electro-polishing is about 12~38 seconds.

9. The metallic housing forming method of claim 7, wherein the surface area of the metallic housing is 70 square decimeters, the value of the direct-current electrical charge varies from 70 to 105 amperes, and the duration period of the electro-polishing process is about 20±2 seconds.

10. The metallic housing forming method of claim 1, wherein the step of electro-polishing the metallic housing comprises a sub-step of immersing the metallic housing in an electrolyte, the metallic housing being employed as anode electrode, an insolubility metal being employed as cathode electrode; and a sub-step of providing direct-current electrical charge to the electrolyte and the metallic housing.

11. The metallic housing forming method of claim 1, wherein an voltage employed in anode-oxiding the metallic housing is about 12.5 volts, and the temperature thereof is about 12~23 degrees Celsius, and a time period of the anode-oxiding process is about 21~23 minutes.

12. A metallic housing forming method, comprising:
    friction stir welding metallic members to form a metallic housing;
    blasting an outer surface of the metallic housing;
    immersing the metallic housing in alkali solution to remove contaminants from the metallic housing, and forming a black layer on the metallic housing;
    stripping the black layer away from the metallic housing;
    electro-polishing the metallic housing to dissolve the extreme outer surface of the metallic housing, a value of a direct-current electrical charge employed in the process in ampere is 1.0~1.5 times of a surface area value of an outer surface of the metallic housing in square decimeter;
    anode-oxiding the metallic housing; and
    sealing and drying the metallic housing.

13. The metallic housing forming method of claim 12, further comprising a step of clearing an outer surface of the metallic housing between the step of welding the metallic members and the step of blasting the metallic housing, and a step of degreasing the metallic housing to remove contaminants from the metallic housing between the step of blasting the metallic housing and the step of immersing the metallic housing in alkali solution.

14. The metallic housing forming method of claim 12, further comprising a step of taking out the metallic housing and drying the metallic housing between the step of electro-polishing the metallic housing and the step of anode-oxiding the metallic housing.

15. The metallic housing forming method of claim 12, wherein the step of electro-polishing the metallic housing includes a sub-step of immersing the metallic housing in an electrolyte, the metallic housing being employed as anode electrode, an insolubility metal being employed as cathode electrode; and a sub-step of providing direct-current electrical charge to the electrolyte and the metallic housing.

16. The metallic housing forming method of claim 15, wherein the electrolyte is consisted of sulphuric acid, orthophosphoric acid and aluminum ion, a volume ratio of the sulphuric acid and orthophosphoric acid is about 2.5~4, a concentration of the aluminum ion is about 10~20 grams per liter.

17. The metallic housing forming method of claim 16, wherein the volume ratio of the sulphuric acid and orthophosphoric is about 3±0.3, and the concentration of the aluminum ion is about 15 grams per liter.

18. The metallic housing forming method of claim 15, wherein the temperature of the electrolyte is about 70~82 degrees Celsius, a value of the direct-current electrical charge in ampere is 1.0~1.5 times of a surface area value of the outer surface of the metallic housing in square decimeter.

19. The metallic housing forming method of claim 18, wherein the temperature of the electrolyte is about 77±2 degrees Celsius, a duration period of the electro-polishing is about 12~38 seconds.

20. The metallic housing forming method of claim 12, wherein an voltage employed in anode-oxiding the metallic housing is about 12.5 volts, and the temperature thereof is about 12~23 degrees Celsius, and a time period of the anode-oxiding process is about 21~23 minutes.

* * * * *